(12) United States Patent
Underhaug

(10) Patent No.: US 7,669,868 B2
(45) Date of Patent: Mar. 2, 2010

(54) BICYCLE ATTACHMENT

(76) Inventor: Njål Underhaug, Rektor Sælandsvei 21, N-4340 Bryne (NO)

( * ) Notice: Subject to any disclaimer, the term of this patent is extended or adjusted under 35 U.S.C. 154(b) by 0 days.

(21) Appl. No.: 11/883,250

(22) PCT Filed: Jan. 30, 2006

(86) PCT No.: PCT/NO2006/000041

§ 371 (c)(1),
(2), (4) Date: Mar. 12, 2008

(87) PCT Pub. No.: WO2006/080855

PCT Pub. Date: Aug. 3, 2006

(65) Prior Publication Data

US 2008/0303239 A1     Dec. 11, 2008

(30) Foreign Application Priority Data

Jan. 31, 2005   (NO) .................................. 20050516

(51) Int. Cl.
*B62K 27/00*       (2006.01)
(52) U.S. Cl. ..................................... 280/204
(58) Field of Classification Search ................. 280/204, 280/292, 293, 304.5
See application file for complete search history.

(56) References Cited

U.S. PATENT DOCUMENTS

| | | | | |
|---|---|---|---|---|
| 3,993,321 A | * | 11/1976 | Cote | 280/204 |
| 4,261,592 A | * | 4/1981 | Busseuil | 280/292 |
| 5,454,578 A | * | 10/1995 | Neack | 280/204 |
| 5,749,592 A | * | 5/1998 | Marchetto | 280/292 |
| 6,050,580 A | * | 4/2000 | Pawelek | 280/204 |
| 6,155,582 A | * | 12/2000 | Bourbeau | 280/204 |
| 6,270,100 B1 | * | 8/2001 | Wunderlich | 280/204 |
| 6,286,847 B1 | * | 9/2001 | Perrin | 280/204 |
| 6,983,947 B2 | * | 1/2006 | Asbury et al. | 280/204 |
| 2003/0011170 A1 | * | 1/2003 | Humes | 280/504 |
| 2004/0155428 A1 | * | 8/2004 | Leon | 280/204 |

FOREIGN PATENT DOCUMENTS

| | | |
|---|---|---|
| FR | 2 467 764 | 10/1979 |
| GB | 1 395 858 | 10/1973 |
| GB | 2 283 467 | 5/1995 |
| GB | 2 296 903 | 7/1996 |

* cited by examiner

*Primary Examiner*—Tony H. Winner
(74) *Attorney, Agent, or Firm*—Porzio, Bromberg & Newman, P.C.

(57) ABSTRACT

An attachment (4, 30, 40) for connecting a first bicycle (1) to at least one second bicycle (2), the bicycles (1, 2) being connected in the direction of motion, and the attachment (4, 30, 40) being rotatably connected to at least one bicycle (1, 2) and extending in a substantially fixed length transversally to the direction of motion, between its respective mounting points (8, 12, 34, 42, 44, 46) on the first bicycle (1) and the second bicycle (2), respectively.

4 Claims, 5 Drawing Sheets

BICYCLE ATTACHMENT

This invention relates to a bicycle attachment. More particularly it concerns an attachment for connecting a first bicycle to at least one second bicycle by means of an attachment, the length of the attachment transversally to the direction of motion between its respective mounting points at the first bicycle and the second bicycle being substantially fixed.

The interconnection of bicycles may be convenient for example during a bicycle trip, when a grown-up person is cycling together with smaller children. When the child does want to cycle by itself any longer, or when traffic conditions suggest that the child should not cycle by itself, it is advantageous to be able to connect the children's bicycle to the adult bicycle. The connection will work best if the propulsion of the children's bicycle may be taken over, at least to a certain degree, by the adult, while at the same time the children's bicycle is following the direction of motion of the adult bicycle.

If it is possible for the person riding the children's bicycle to influence the steering of the children's bicycle to a certain degree, this will help to give the person a more secure feeling while this person is simultaneously taught to find the balance on the children's bicycle himself.

In what follows, the adult bicycle, most often the leading, bicycle, is referred to as the first bicycle, whereas the children's bicycle is referred to as the second bicycle.

It is known to connect a second bicycle to a first bicycle by means of a rod. The rod may be connected, when the second bicycle is behind the first bicycle, between the seat post of the first bicycle and the head tube of the second bicycle. Alternatively, when the second bicycle is in front of the first bicycle, the rod may be connected to the seat post of the second bicycle and to the head tube of the first bicycle. In the first embodiment the second bicycle is pulled by the first bicycle, whereas the second bicycle is pushed in the second embodiment.

This form of connection has the effect that the first bicycle pulls the second bicycle along, but does not take over the steering of the second bicycle.

Another prior art solution requires the front wheel of the second bicycle to be lifted from the ground, possibly the front wheel to be removed from the second bicycle. A bail fixed to the second bicycle is rotatably connected to the first bicycle about the seat post of the first bicycle, for example. Thereby, the second bicycle is connected to the first bicycle like a one-wheel trailer. The person on the second bicycle does not have any possibility of influence with respect to the steering of the second bicycle.

The invention has as its object to remedy or reduce at least one of the drawbacks of the prior art.

The object is achieved in accordance with the invention through the features specified in the description below and in the subsequent Claims.

A first bicycle is connected to at least one second bicycle by means of an attachment, the length of the attachment, transversally to the direction of motion between its respective mounting points at the first bicycle and the second bicycle, respectively, being substantially fixed.

The front wheel fork of the second bicycle may be rotatively connected to the first bicycle by means of connections, the relative directional change of the first bicycle relative to the second causing the front wheel fork and thereby the front wheel of the second bicycle to turn in a corresponding direction.

In a preferred embodiment a first or a second attachment is provided with a rotary arm and a cantilever arm. The rotary arm is rotatably supported in a bearing located on the first bicycle. The rotary arm rotates about an axis which is located, during normal cycling, approximately in the horizontal plane. The cantilever arm projects at an angle from the rotary arm and to an articulated attachment, for example a connecting ball connected to the second bicycle.

The articulated attachment, typically said connecting ball, may be positioned in front of the handle bar of the second bicycle and be connected to the frame of the second bicycle. Alternatively, it may be arranged above the handle bar of the second bicycle on the axis of the head tube. It may be practical to use an articulated attachment which is connected to, for example, the seat post of the second bicycle.

It is advantageous that the second bicycle is provided with a front wheel bail which is connected to the front wheel fork of the second bicycle, the front wheel bail extending substantially horizontally forwards. The front wheel bail is connected at its leading portion to the cantilever arm by means of a connecting rod. The connecting rod is arranged to steer the front wheel and the inclination of the second bicycle according to the direction of motion and inclination of the first bicycle. It has turned out that the connection works best when the connecting point between the connecting rod and the front wheel bail is relatively close to the ground.

In an alternative embodiment the second bicycle is connected to the first bicycle by means of a third attachment which is articulatedly connected to the first bicycle in a front articulated suspension and in a rear articulated suspension. The third attachment is thus rotatable about an axis extending through said two articulated suspensions. The third attachment is articulatedly and releasably connected to the second bicycle in a connecting suspension.

The third attachment comprises a carrier rod extending from the rear rotatable suspension attached to the frame of the first bicycle to the connecting suspension which is attached to the head tube of the second bicycle. A spacing rod extending between the front articulated suspension is connected to a rotatable intermediate bearing of the carrier rod.

Said axis may, with advantage, be parallel or perpendicular to the direction of motion, as described in the special part of the specification.

It is advantageous that the carrier rod extends rigidly from the rear articulated suspension to the connecting suspension, as at least part of the spacing rod is articulatedly connected to the carrier rod for the steering of the first bicycle not to be hindered by the mounting of the spacing rod to the front wheel fork of the first bicycle.

This third attachment causes the second bicycle to be kept in a desired position longitudinally and laterally relative to the first bicycle.

A steering rod, rotatable at both its end portions, extends from the front wheel bail of the second bicycle to the front wheel bail of the first bicycle. The front wheel bail of the first bicycle is connected to the front wheel fork of the first bicycle and extends substantially horizontally forwards.

The connecting points of the steering rod are located at substantially the same mutual distance from the front wheel axle of the first bicycle and the front wheel axle of the second bicycle, respectively, and at the same distance from the ground. It is advantageous for the at least one connecting point of the steering rod to be resiliently mounted to arrange for a certain amount of steering of the second bicycle by a person located on the second bicycle.

The steering rod with steering bails causes the front wheel direction of the second bicycle to follow the front wheel direction of the first bicycle.

By placing the first and second bicycles beside each other, there is arranged for easy supervision and communication between the persons on the bicycles. The invention also arranges for more second bicycles to be connected to the first bicycle.

All rods, bearings and mounting points may be formed of a rigid or elastic material in order to achieve a desired resilience in the attachment with associated equipment.

It is evident that the size of the bicycle or the form of propulsion is not vital to the characteristic features of the invention and the bicycles may be of any kind and size. Thus, the first, second and third attachments are adjustable and arranged to be adapted for most bicycles.

Most connections are formed as quick release couplings and it is thus easy and quick to connect or disconnect the second bicycle to/from the first bicycle.

In what follows, there is described an example of a preferred embodiment which is visualized in the accompanying drawings, in which.

Figure 1:
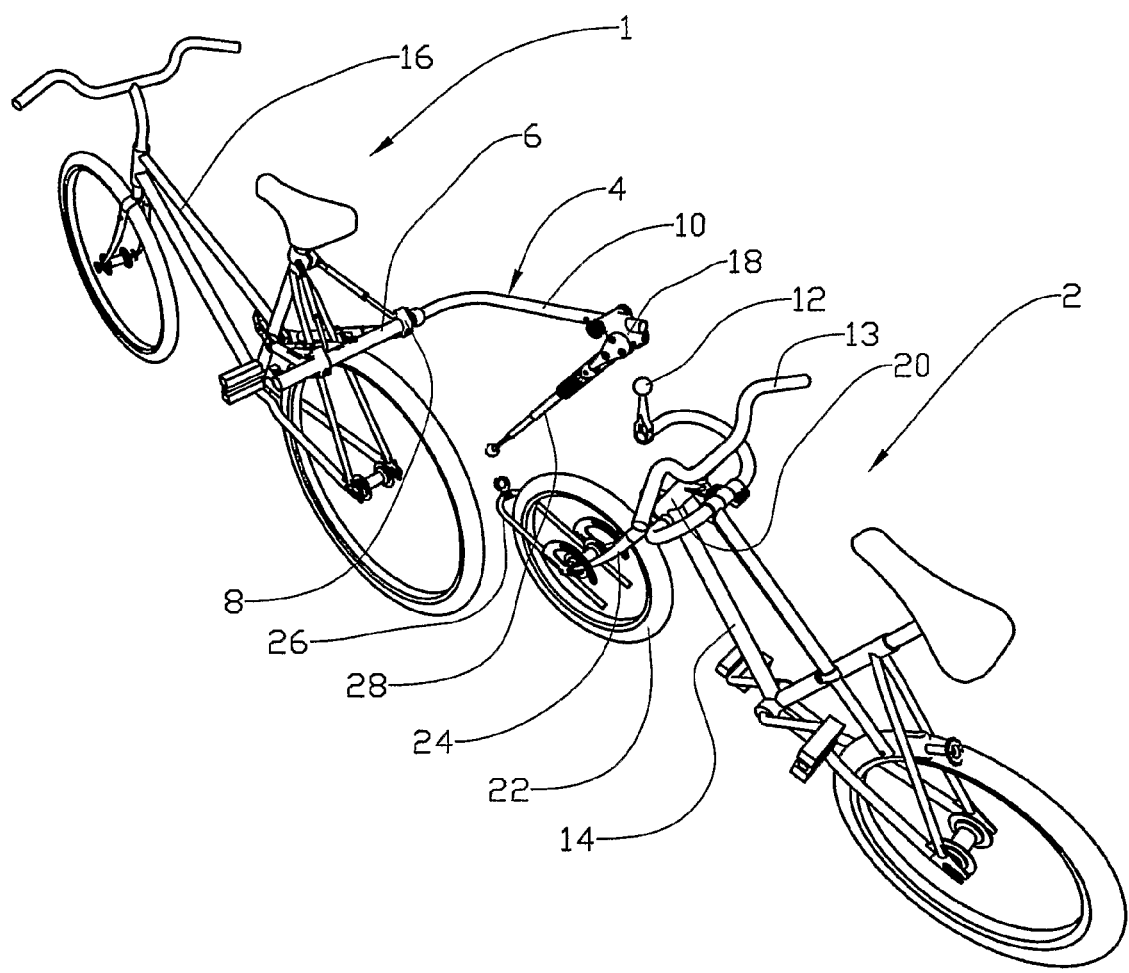
FIG. 1 shows a first bicycle which is ready to be connected to a second bicycle by means of a first attachment.

In the drawings the reference numeral 1 denotes a first bicycle which is connected to a second bicycle 2 by means of a first attachment 4.

The first attachment 4 comprises a rotary arm 6 which is rotatably arranged in a bearing 8 about an axis which is perpendicular to the vertical plane of the first bicycle, whereas a cantilever arm 10 extends perpendicularly from the rotary arm 6 to a connecting ball 12 located in front of the handle bar 13 of the second bicycle 2. The connecting ball 12 is connected to the frame 14 of the second bicycle 2.

The bearing 8 is connected to the frame 16 of the first bicycle 1, whereas the first attachment 4 is provided with a ball cup 18 releasably and complementarily matching the connecting ball 12. The connecting ball 12 and the ball cup 18 constitute an articulated connection.

The first attachment 4 thereby causes the connecting ball 12 of the second bicycle 2 to be kept in an approximately fixed position longitudinally and laterally relative to the first bicycle 1.

The bearing 8 together with the connecting ball 12 makes height variations in the ground and tilt-induced height variations be absorbed by the first attachment 4.

Steering of the front wheel 22 of the second bicycle 2 is achieved by connecting the front wheel fork 24 of the second bicycle 2 to the first attachment 4.

Figure 2:
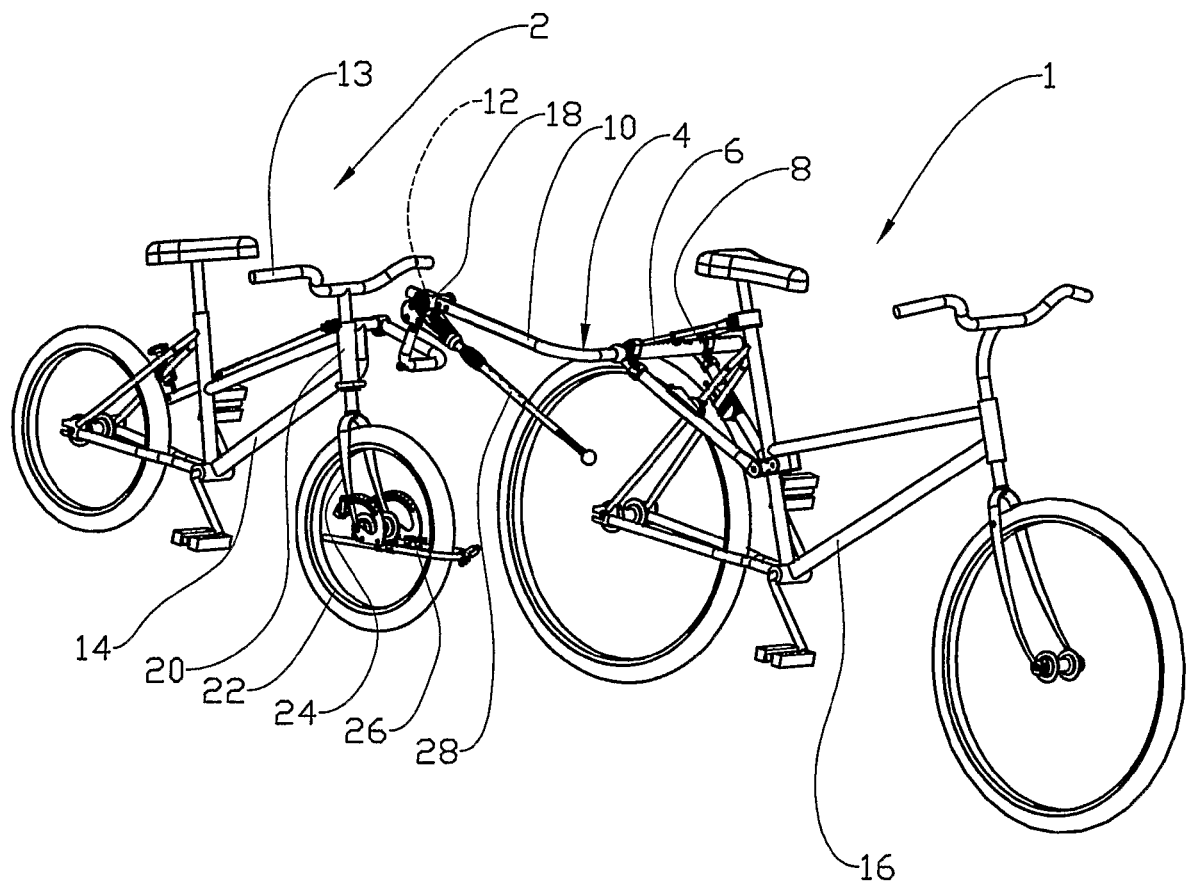
FIG. 2 shows a first bicycle which is connected to a second bicycle by means of a first attachment.
Figure 3:
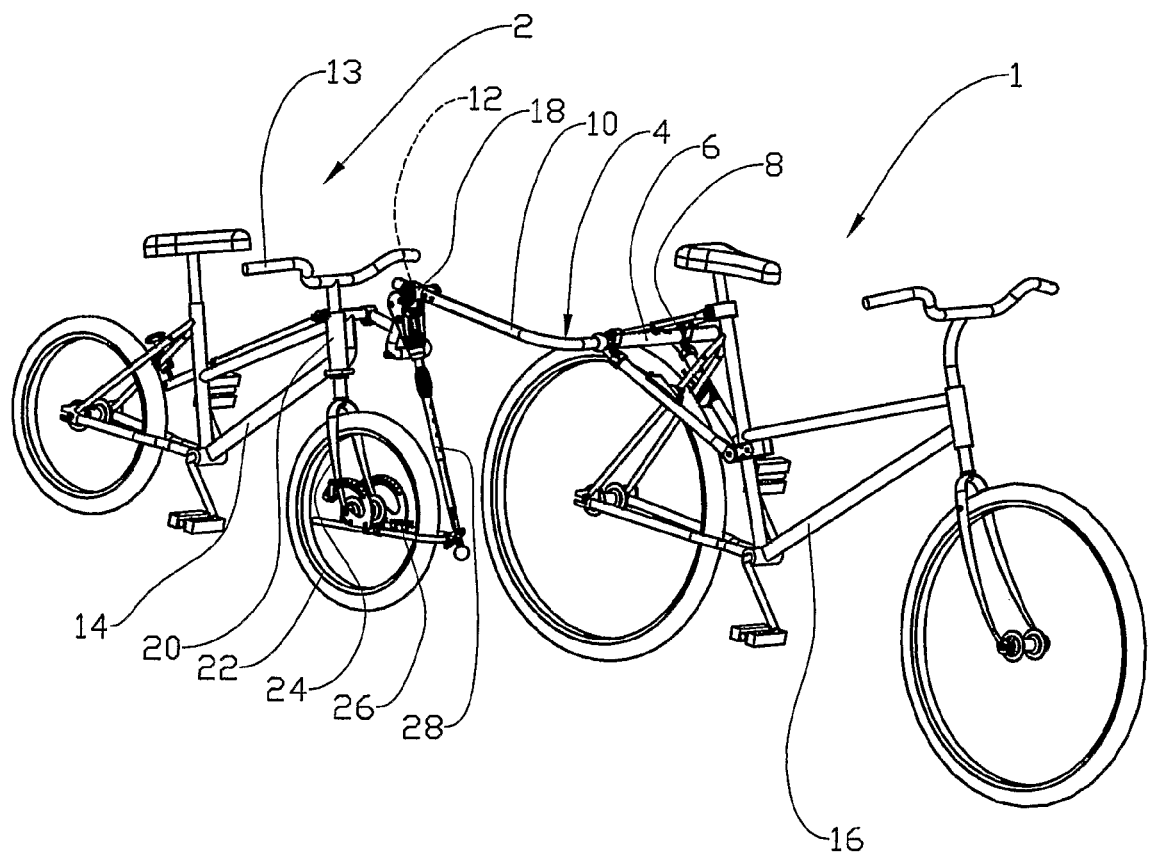
FIG. 3 shows the same as FIG. 2, but here the front wheel fork of the second bicycle is connected to the first attachment.

In this preferred embodiment, see FIG. 2, the second bicycle 2 is provided with a front wheel bail 26 which is connected to the front wheel fork 24 and extends substantially horizontally forwards to in front of the front wheel 22. Rotatable about an axis which is perpendicular to the direction of motion, a connecting rod 28 extends from the ball cup 18 down to the front wheel bail 26 where it is detachably connected.

When the first bicycle 1 turns relative to the second bicycle 2, the ball cup 18 is rotated somewhat relative to the vertical axis of the connecting ball 12. The connecting rod 28 then causes the front wheel fork 24 and the front wheel 22 of the bicycle 2 to be rotated and take the same direction as the first bicycle 1.

By placing the connecting ball 12 at a suitable distance in front of the head tube 20 of the second bicycle and above the front wheel 22 of the second bicycle 2, the second bicycle will tilt just as much as the first bicycle in a curve. By choosing a suitable springing in the connecting rod 28, a person, not shown, on the second bicycle 2 may to some degree influence the balance of the second bicycle 2 also when the connecting rod 28 is connected to the front wheel bail 26.

Figure 4:
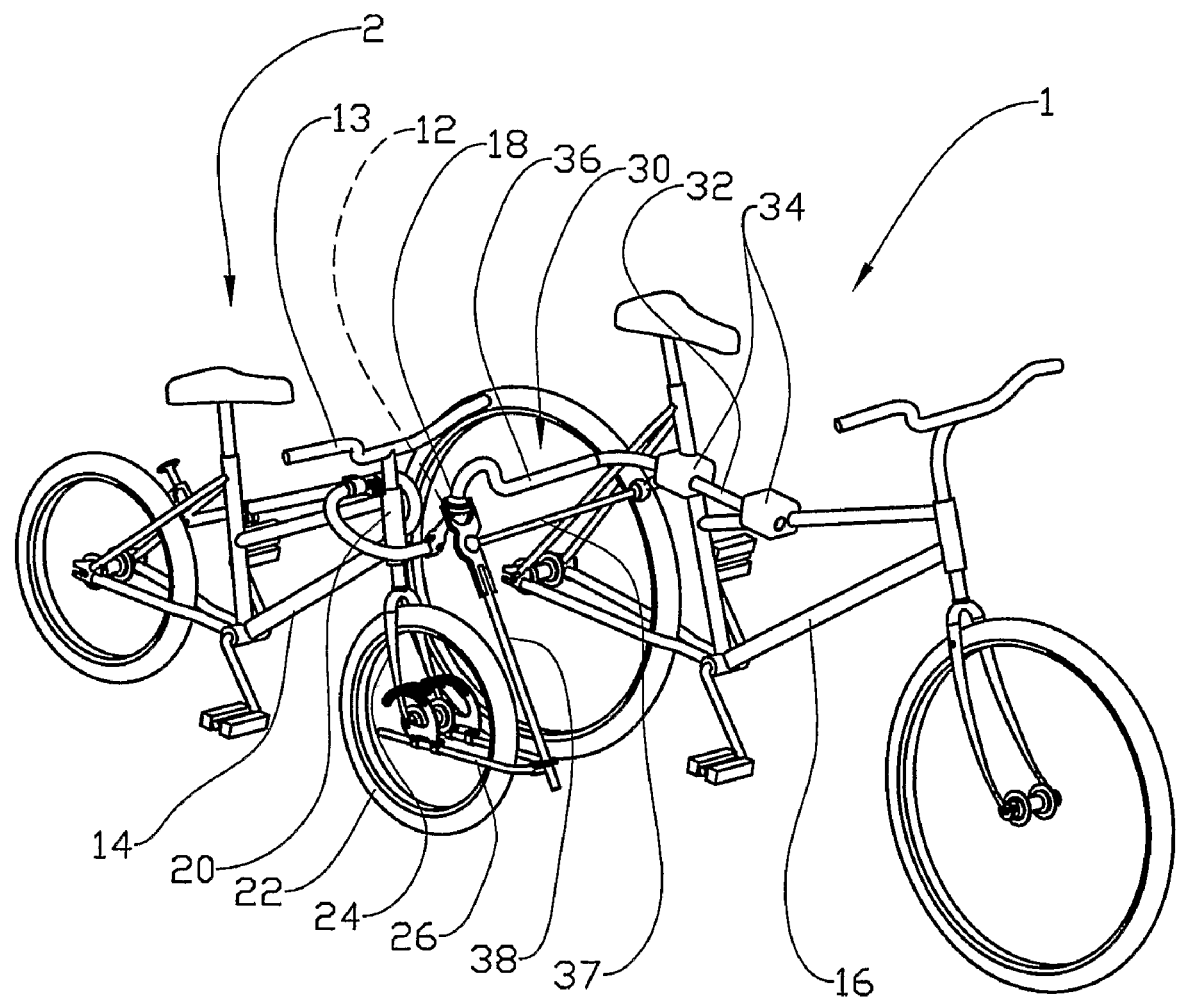
FIG. 4 shows an alternative embodiment, in which a tie rod is arranged between the first bicycle and the connecting rod.

In an alternative embodiment, see FIG. 4, a second attachment 30 is connected between the first bicycle 1 and the second bicycle 2. The rotary arm 32 of the second attachment 30 is rotatably supported in a second bearing 34, the rotary axis of the second bearing 34 being substantially parallel to the direction of motion of the first bicycle 1.

The cantilever arm 36 of the second attachment 30 is connected to the connecting ball 12 of the second bicycle 2. A tie rod 37 extends rotatably between the first bicycle 1 and the connecting rod 38 of the second attachment 30. The tie rod 37 is arranged to keep the connecting rod 38 substantially parallel to the inclination of the first bicycle 1.

In other respects, the operation of the second attachment 30 is substantially similar to the operation of the first attachment 4.

Figure 5:
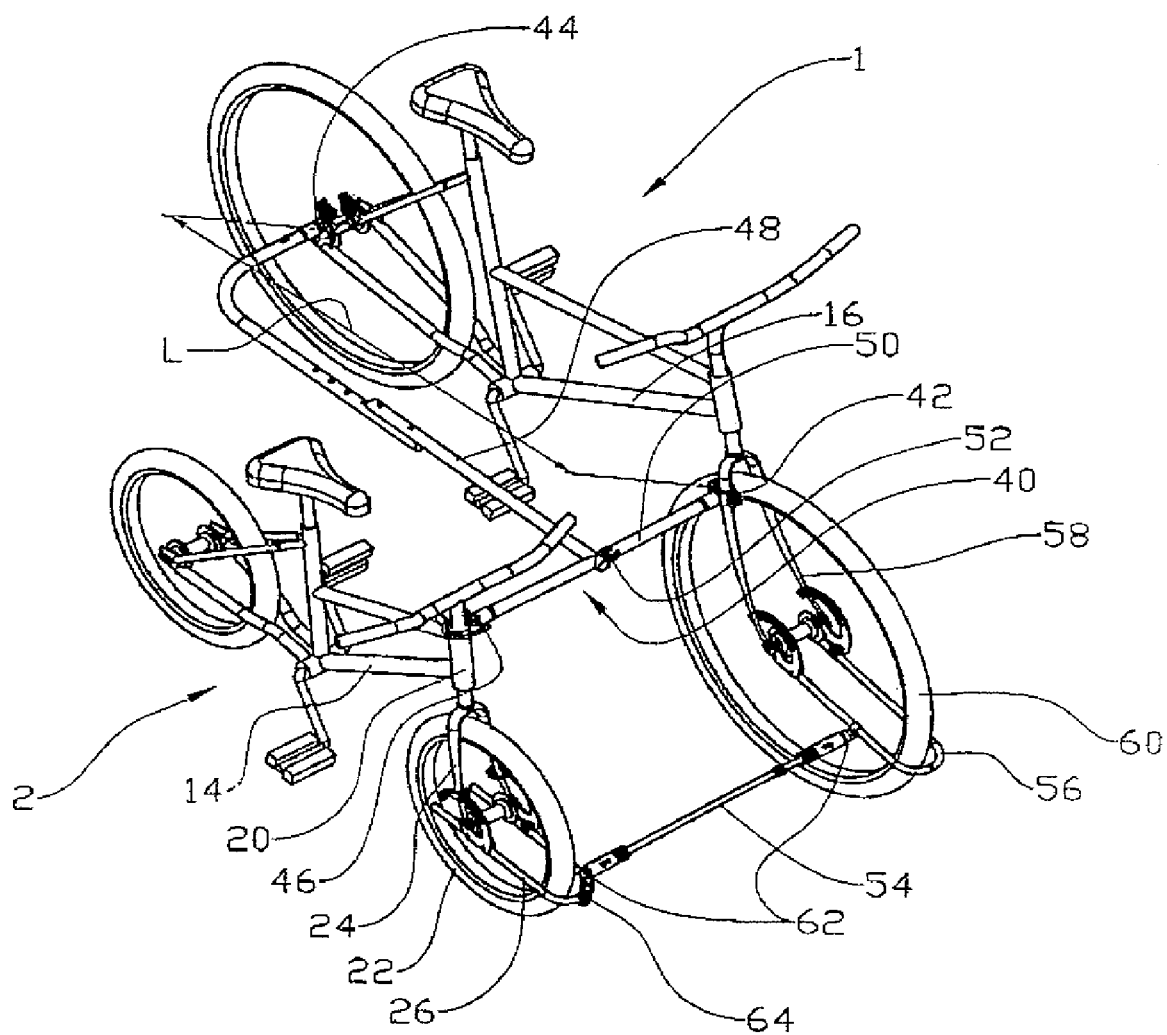
FIG. 5 shows a further embodiment, in which the second bicycle is connected to the first bicycle by means of a second attachment, and in which the front wheel fork of the second bicycle is connected to the front wheel fork of the first bicycle.

In a further embodiment, see FIG. 5, the second bicycle 2 is connected to the first bicycle 1 by means of a third attachment 40 which is articulatedly connected to the first bicycle 1 at a front articulated suspension 42 and a rear articulated suspension 44 and to the second bicycle 2 at an articulated connecting suspension 46.

The third attachment 40 comprises a carrier rod 48 extending from the rear articulated suspension 44 attached to the frame of the first bicycle 1 to the connecting suspension 46 attached to the head tube 20 of the second bicycle 2. A spacing rod 50 extends between the front articulated suspension 42 and to a rotatable intermediate bearing 52 on the carrier rod 48. The axis of the intermediate bearing 52 is approximately vertical.

The carrier rod 48 is arranged to keep the second bicycle 2 in a fixed longitudinal position relative to the first bicycle 2.

The spacing rod 50 is arranged to maintain a substantially constant lateral distance between the bicycles 1 and 2, but allow the front articulated suspension 42 to move somewhat when the front wheel fork 58 of the first bicycle 1 is turned.

If it is desirable for the inclination of the second bicycle 2 to be smaller than the inclination of the first bicycle 1, it is practical to place at least the front rotatable suspension 42 somewhat lower in height than the connecting suspension 46.

A steering rod 54, which is articulated at both its end portions, extends from the front wheel bail 26 of the second bicycle 2 to the front wheel bail 56 of the first bicycle 1. The front wheel bail 56 is connected to the front wheel fork 58 of the first bicycle 1 and extends substantially horizontally forwards to in front of the front wheel 60 of the first bicycle 1.

To ensure correct steering, the connecting point 62 of the steering rod 54 which may be, for example, a resilient suspension 64 formed of rubber, for example, should be at substantially the same mutual distance from the axles of the respective front wheels 22, 60 and at the same distance from the ground.

The bearings 8 and 34, connecting ball 12, suspensions 42, 44 and connection suspension 46 constitute the mounting points for the attachments 4, 30 and 40 on the first bicycle 1 and the second bicycle 2, respectively.

The resilient suspension 64 enables a person, not shown, on the second bicycle 2 to balance the second bicycle 2 by himself to a certain degree.

This further exemplary embodiment is particularly well suited for children who have not yet learnt how to cycle.

The invention claimed is:

1. An attachment for connecting a first bicycle to at least one second bicycle, comprising:
   a. a carrier connected to a rear suspension of the first bicycle and extended forwardly and connected to a spacing rod;
   b. the spacing rod arranged to keep the bicycles at a substantially fixed distance, wherein the spacing rod is connectable to both bicycles by means of front suspensions;
   c. wherein one of the front suspension connected to a front wheel fork of the first bicycle; and
   d. wherein the spacing rod allows the front suspension to move when the front wheel fork of the first bicycle is turned.

2. The attachment in accordance with claim 1, further comprising a steering rod, said rod rotatably connected to both bicycle at a front wheel bail.

3. The attachment in accordance with claim 2, wherein the two connecting points of the steering rod are at substantially the same distance from respectively front wheel axles of both bicycles and at the same distance from the ground.

4. The attachment in accordance with claim 3, wherein the connecting points of the steering rod are formed of an elastic material.

* * * * *